No. 620,766. Patented Mar. 7, 1899.
A. J. GÖRANSSON & E. W. LINDGREN.
TAP.
(Application filed Aug. 26, 1898.)
(No Model.)
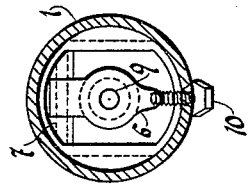
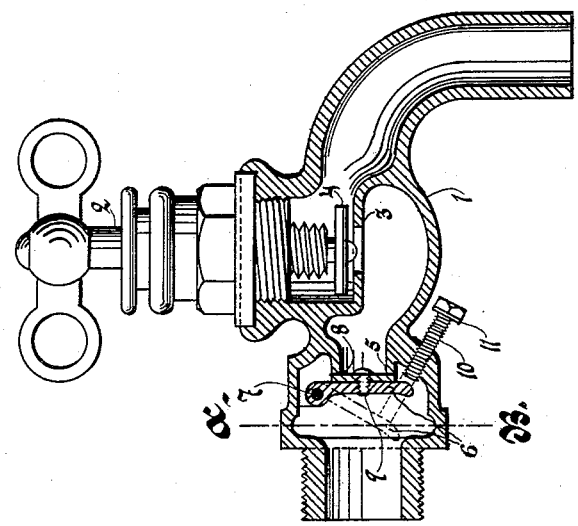
Witnesses.
Carl Otto Sahlberg
Signe Petersson.
Inventors.
Anders Johan Göransson
Erich Waldemar Lindgren
THE NORRIS PETERS CO., PHOTO-LITHO., WASHINGTON, D. C.

UNITED STATES PATENT OFFICE.

ANDERS JOHAN GÖRANSSON AND ERICK WALDEMAR LINDGREN, OF STOCKHOLM, SWEDEN.

TAP.

SPECIFICATION forming part of Letters Patent No. 620,766, dated March 7, 1899.

Application filed August 26, 1898. Serial No. 689,603. (No model.)

*To all whom it may concern:*

Be it known that we, ANDERS JOHAN GÖRANSSON and ERICK WALDEMAR LINDGREN, subjects of the King of Sweden and Norway, and residents of Scheclegatan 22, Stockholm, Sweden, have invented a new and useful Improvement in Taps, of which the following is a specification.

This invention relates to taps, and has for its object to shut off the admission of water when the tap, as frequently happens, is to be repaired or provided with new washers.

The invention is shown in the accompanying drawings, in which—

Figure 1 is a longitudinal section of the improved tap, and Fig. 2 a cross-section on the line A B of Fig. 1.

The tap is an ordinary water-main tap, such as is used in the kitchen; and it consists of the ordinary parts—namely, a casing 1 and valve, which bears on the valve-seat 3 by means of a washer 4. A short tubular projection 5 runs from the interior of the cock-casing and serves as seat for a valve 6, which is revoluble on a pin 7, mounted in the tap. Between the tubular projection 5 and valve 6 a washer 8 is provided, which is held on the valve by means of a screw 9. Beneath the said tubular projection 5 a screw 10 is inserted in the wall of the cock-casing and bears against the free projection part of the valve 6 underneath the said projection 5. Said screw 10 is provided with a washer 11. In ordinary use the screw 10 is screwed in as far as it will go, so that the packing or washer is compressed between the wall of the cock-casing and the screw-head. The screw then holds the valve 6 raised, as shown in dotted position in Fig. 1. If the tap is to be repaired or a fresh washer is to be introduced in the valve, the screw 10 is screwed out, so that it does not come in contact with the flap of the valve. The water-pressure then forces the latter firmly against the seat of tubular projection 5, so that no water can escape, after which the necessary repairs may be carried out unimpededly.

What we claim as our invention, and desire to secure by Letters Patent, is—

1. In a tap such as described, the combination with the main hand-operated valve, of an auxiliary gravity-valve on the inlet side of said main valve, and means for unseating said auxiliary valve and holding the same off its seat when unseated, for the purpose set forth.

2. In water-main taps which have a valve for shutting off the water and which is pressed by means of a screw against a valve-seat the combination therewith of another valve mounted behind the first-mentioned valve in opposition to the course of the water, the said second valve consisting of a tubular projection 5 proceeding from the interior of the cock-casing and forming a seat and a flap 6 having one end pivotally mounted on a pin 7 in the cock and the other free end projecting over the seat and adapted to be engaged by a screw 10 arranged in the wall of the cock-chamber, which screw is capable of being operated from the outside, whereby the valve when in ordinary use may be held raised by said screw, while in the case of repairs to the tap being necessary said valve upon the screw being screwed out may be pressed by the water-pressure against its seat, substantially as hereinbefore described.

In testimony that we claim the foregoing as our invention we have signed our names, in presence of two witnesses, this 2d day of August, 1898.

ANDERS JOHAN GÖRANSSON.
ERICK WALDEMAR LINDGREN.

Witnesses:
CARL OTTO SAHLBERG,
SIGUS PETTERSSON.